US012645375B2

(12) United States Patent
Huang

(10) Patent No.: US 12,645,375 B2
(45) Date of Patent: Jun. 2, 2026

(54) ERASE METHOD FOR NON-VOLATILE MEMORY DEVICE AND NON-VOLATILE MEMORY DEVICE USING THE SAME

(71) Applicant: Winbond Electronics Corp., Taichung City (TW)

(72) Inventor: Koying Huang, San Jose, CA (US)

(73) Assignee: Winbond Electronics Corp., Taichung City (TW)

( * ) Notice: Subject to any disclaimer, the term of this patent is extended or adjusted under 35 U.S.C. 154(b) by 212 days.

(21) Appl. No.: 18/334,399

(22) Filed: Jun. 14, 2023

(65) Prior Publication Data

US 2024/0419339 A1 Dec. 19, 2024

(51) Int. Cl.
*G06F 3/06* (2006.01)

(52) U.S. Cl.
CPC .......... *G06F 3/0625* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 7,385,851 B1 * | 6/2008 | Park | G11C 16/3404 |
| | | | 365/185.21 |
| 9,343,160 B1 * | 5/2016 | Dutta | G11C 16/345 |
| 9,384,844 B1 | 7/2016 | Teng | |
| 9,786,378 B1 * | 10/2017 | Zhang | G11C 16/0483 |
| 10,665,303 B1 * | 5/2020 | Lee | G11C 16/0483 |
| 10,770,158 B1 * | 9/2020 | Gupta | G11C 29/24 |
| 2003/0214852 A1 * | 11/2003 | Chang | G11C 16/3445 |
| | | | 365/200 |
| 2005/0052908 A1 * | 3/2005 | Tomoeda | G11C 16/16 |
| | | | 365/185.29 |
| 2006/0158940 A1 | 7/2006 | Shappir et al. | |

(Continued)

FOREIGN PATENT DOCUMENTS

| | | |
|---|---|---|
| CN | 110660438 | 10/2021 |
| TW | 201140598 | 11/2011 |

(Continued)

OTHER PUBLICATIONS

"Office Action of Taiwan Counterpart Application", issued on Apr. 22, 2025, p. 1-p. 10.

*Primary Examiner* — Ryan Dare
(74) *Attorney, Agent, or Firm* — JCIPRNET

(57) ABSTRACT

In an aspect, the disclosure is directed to a cell erase method which includes not limited to: initiating an erase operation of a block of memory cells by applying an erase condition to the block of memory cells; performing a first erase verification procedure for at least a portion of the block of memory cells in comparison with a first erase verify voltage; adjusting the first erase verify voltage in response the portion of the block of memory cells having passed the first erase verification procedure; performing a second erase verification procedure for the block of memory cells in comparison with the adjusted erase verify voltage; performing a post program verification procedure for the block of memory cells in comparison with a post program verify voltage to detect leakage current of the block of memory cells; determining whether the adjusted erase verify voltage reaches a final erase verify voltage.

20 Claims, 12 Drawing Sheets

400

Receive an erase command — S401

Apply an erase condition to erase a block of memory cells — S402

Perform a first erase verification procedure on the block of memory cells in comparison with a first erase verify voltage — S403

Perform a second erase verification procedure on the block of memory cells reached the first erase verify voltage in comparison with a second erase verify voltage — S404 perform a post program verification procedure to detect whether the block of memory cells reached the second erase verify voltage are close to being overly erased according to a post program verify voltage — S405

Determine whether the post program verify voltage and the second erase verify voltage reach a final post program verify voltage and a final erase verify voltage, respectively, if the post program verification procedure is passed — S406

No / Yes

S408 / S407

Adjust the post program verify voltage and the second erase verify voltage

Finish the erase operation

(56) References Cited

U.S. PATENT DOCUMENTS

| | | | | |
|---|---|---|---|---|
| 2007/0047327 | A1 | 3/2007 | Goda et al. | |
| 2008/0144387 | A1* | 6/2008 | Kim | G11C 16/16 |
| | | | | 365/185.33 |
| 2009/0003054 | A1* | 1/2009 | Hung | G11C 16/3454 |
| | | | | 365/185.03 |
| 2009/0285028 | A1* | 11/2009 | Park | G11C 16/3445 |
| | | | | 365/185.29 |
| 2011/0069544 | A1* | 3/2011 | Ho | G11C 11/5628 |
| | | | | 365/185.03 |
| 2012/0072645 | A1 | 3/2012 | Kasai et al. | |
| 2012/0236653 | A1* | 9/2012 | Spessot | G11C 29/028 |
| | | | | 365/185.18 |
| 2013/0016558 | A1* | 1/2013 | Ahn | G11C 16/0483 |
| | | | | 365/185.03 |
| 2013/0163337 | A1* | 6/2013 | Li | G11C 16/3418 |
| | | | | 365/185.17 |
| 2014/0269090 | A1 | 9/2014 | Flynn et al. | |
| 2014/0310448 | A1* | 10/2014 | Nam | G06F 3/0659 |
| | | | | 711/103 |
| 2016/0099063 | A1* | 4/2016 | Shim | G11C 16/3445 |
| | | | | 365/185.29 |
| 2018/0122489 | A1* | 5/2018 | Ray | G11C 16/3495 |
| 2019/0051362 | A1* | 2/2019 | Lee | G11C 16/14 |
| 2020/0135283 | A1* | 4/2020 | Park | G06F 3/0604 |
| 2020/0402582 | A1* | 12/2020 | Yang | G06F 3/0679 |
| 2022/0101930 | A1* | 3/2022 | Choi | G11C 16/349 |
| 2022/0172793 | A1* | 6/2022 | Kim | G11C 16/14 |
| 2022/0223210 | A1* | 7/2022 | Huang | G11C 16/10 |
| 2022/0230695 | A1* | 7/2022 | Park | G11C 7/1057 |
| 2023/0058038 | A1* | 2/2023 | Zainuddin | G11C 16/349 |
| 2024/0029804 | A1* | 1/2024 | Song | G11C 16/3445 |
| 2024/0046996 | A1* | 2/2024 | Song | G11C 16/0483 |
| 2024/0071533 | A1* | 2/2024 | Liu | G11C 16/349 |
| 2024/0096422 | A1* | 3/2024 | Kosako | G11C 16/3445 |
| 2024/0112742 | A1* | 4/2024 | Huang | G11C 16/3445 |
| 2024/0153568 | A1* | 5/2024 | Choi | G11C 16/08 |
| 2025/0218517 | A1* | 7/2025 | Huang | G11C 5/063 |

FOREIGN PATENT DOCUMENTS

| | | |
|---|---|---|
| TW | I574272 | 3/2017 |
| TW | I685846 | 2/2020 |
| TW | I718640 | 2/2021 |

* cited by examiner

200

400

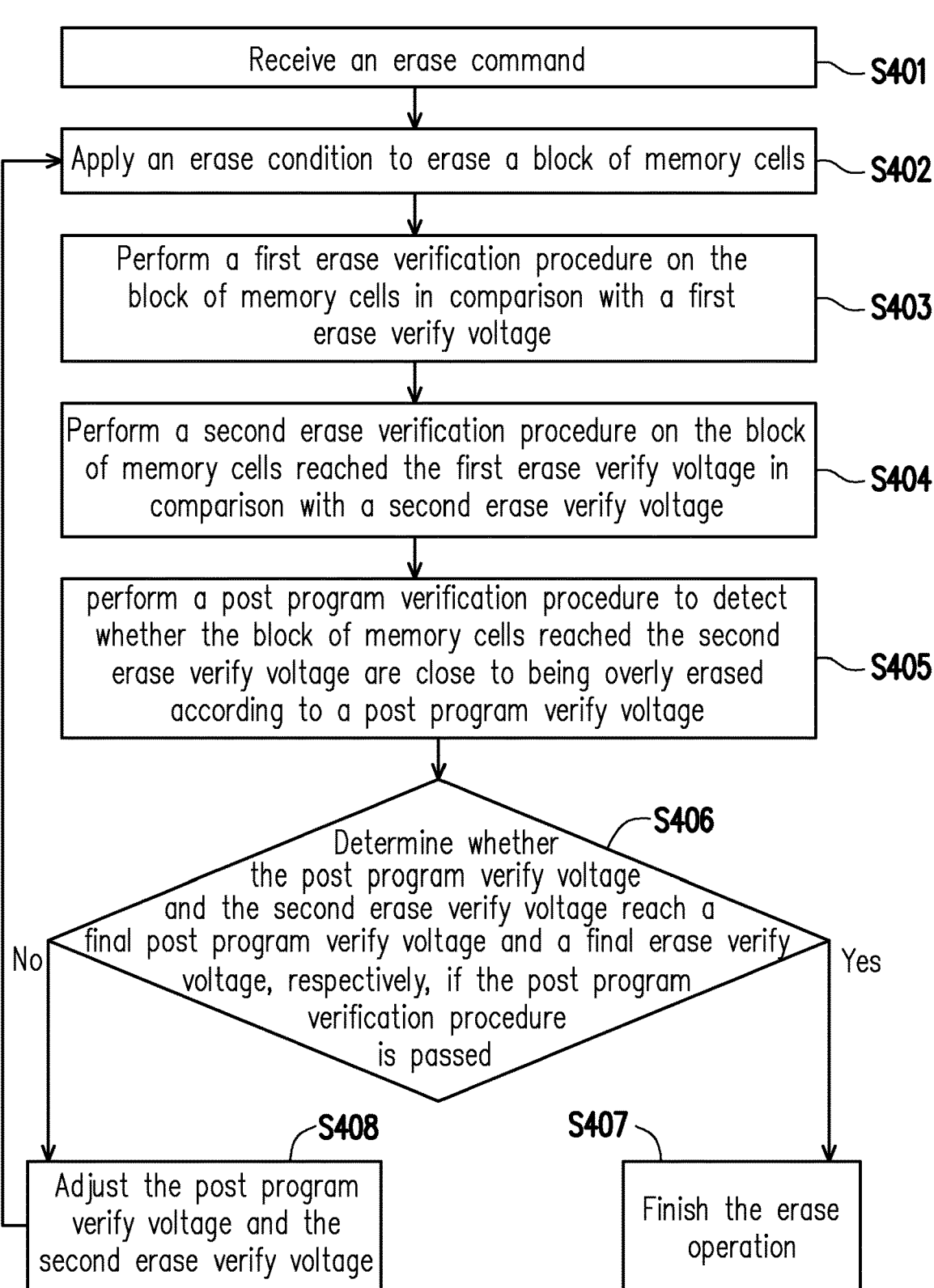

Receive an erase command — S401

Apply an erase condition to erase a block of memory cells — S402

Perform a first erase verification procedure on the block of memory cells in comparison with a first erase verify voltage — S403

Perform a second erase verification procedure on the block of memory cells reached the first erase verify voltage in comparison with a second erase verify voltage — S404 perform a post program verification procedure to detect whether the block of memory cells reached the second erase verify voltage are close to being overly erased according to a post program verify voltage — S405

Determine whether the post program verify voltage and the second erase verify voltage reach a final post program verify voltage and a final erase verify voltage, respectively, if the post program verification procedure is passed — S406

No

Yes

Adjust the post program verify voltage and the second erase verify voltage — S408

Finish the erase operation — S407

FIG. 3

ERASE METHOD FOR NON-VOLATILE MEMORY DEVICE AND NON-VOLATILE MEMORY DEVICE USING THE SAME

TECHNICAL FIELD

The disclosure is related to a semiconductor memory, which is directed to an erase method for a non-volatile memory device and a non-volatile memory device using the same method.

BACKGROUND

During the erase operation for a flash memory device, as an entire block is erased, the different variations of the threshold voltages may cause certain cells to not have been properly erased, and some cells may have threshold voltages close to a low voltage resulting in leakage current, which are also called as over-erased cells.

In further detail, as shown in FIG. 1, a conventional erase operation includes an erase pulse applying procedure 201, erase verifying procedure 202, and a post program procedure 203. If the post program operation is performed, the threshold voltage of the memory cell having the fastest erase rate rises faster than the threshold voltage of the memory cell having the slowest erase rate. Accordingly, the threshold voltage distributions of the memory cells can be narrowed. Although implemented differently, the purpose of the post program operation 203 is also well known and essentially involves recovering cells that have been overly erased.

Further, a cell that is over erased or very close to be overly erase may have a bit line leakage current that is above an acceptable level. Since an actual cell verify current is equals to the sum of the bit line leakage current and a cell current, the presence of the leakage current may cause the cell verify current to be abnormally high and thus causing a read failure. Since a bit line is shared among multiple cells, the high bit line leakage current would also cause read failures for all the cells that are sharing the same bit line. FIG. 2 shows an example of the above described problem. In FIG. 2, assuming that there is a sector or a block of cell 301 selected for an erase operation, there could be significant leakage current if the post program operation has not been finished. Thus, the leakage current would cause the rest of the unselected sectors block 302 sharing the same bit line read or program failures. Moreover, there could also be power drops of bit line bias voltage during an erase operation, and the power drop may also increase the bit line leakage current if the post program operation is not finished before the power drop. Therefore, the current erase operation of a memory device could be further be improved in order to resolve the above described difficulties.

SUMMARY OF THE DISCLOSURE

A cell that is over erased or very close to be overly erase may have a bit line leakage current that is above an acceptable level. Accordingly, in order to resolve such problem, the disclosure is directed to an erase method for a non-volatile memory device and a non-volatile memory device using the same method.

In an aspect, the disclosure is directed to an erase method which includes not limited to: initiating an erase operation of a block of memory cells by applying an erase condition to the block of memory cells; performing a first erase verification procedure for at least a portion of the block of memory cells in comparison with a first erase verify voltage;

adjusting the first erase verify voltage in response to at least the portion of the block of memory cells having passed the first erase verification procedure; performing a second erase verification procedure for at least the portion of the block of memory cells in comparison with the adjusted erase verify voltage; performing a post program verification procedure for the block of memory cells in comparison with a post program verify voltage to detect overly erased cells or leakage current of the block of memory cells; determining whether the adjusted erase verify voltage reaches a final erase verify voltage, and whether the post program verify voltage reaches a final post program verify voltage; and finishing the erase operation in response to the adjusted erase verify voltage having reached the final erase verify voltage and the post program verify voltage having reached the final post program verify voltage.

In one of the exemplary embodiments, the disclosure is directed to a memory device which includes not limited to: a block of memory cells, and a controller coupled to the block of memory cells and is configured to: initiate an erase operation of a block of memory cells by applying an erase condition to the block of memory cells; perform a first erase verification procedure for at least a portion of the block of memory cells in comparison with a first verify voltage; adjust the first verify voltage in response to at least a portion of the block of memory cells having passed the first erase verification procedure; perform a second erase verification procedure for the block of memory cells in comparison with the adjusted erase verify voltage; perform a post program verification procedure for the block of memory cells in comparison with a post program verify voltage to detect overly erased cells or leakage current of the block of memory cells; determine whether the adjusted erase verify voltage reaches a final erase verify voltage, and whether the post program verify voltage reaches a final post program verify voltage; and finish the erase operation in response to the adjusted erase verify voltage having reached the final erase verify voltage and the post program verify voltage having reached the final post program verify voltage.

The disclosure is able to more efficiently erase a block of memory cells by minimizing the leakage current while conserving the number of erase pulses without significantly increase the amount of time needed to erase a block of memory cells.

BRIEF DESCRIPTION OF THE DRAWINGS

FIG. 3 illustrates the erase method according to an exemplary embodiment of the disclosure.

DETAILED DESCRIPTION OF DISCLOSED EMBODIMENTS

Figure 1:
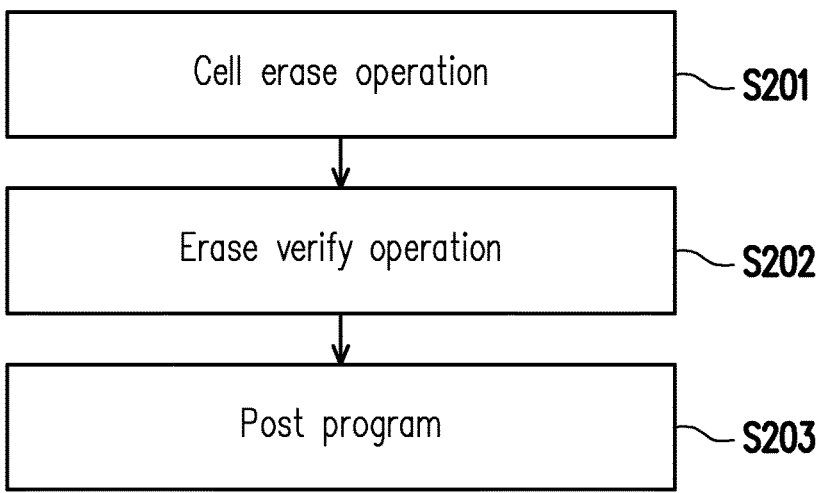
FIG. 1 illustrates an overview of a conventional erase method for a flash memory device.
Figure 2:
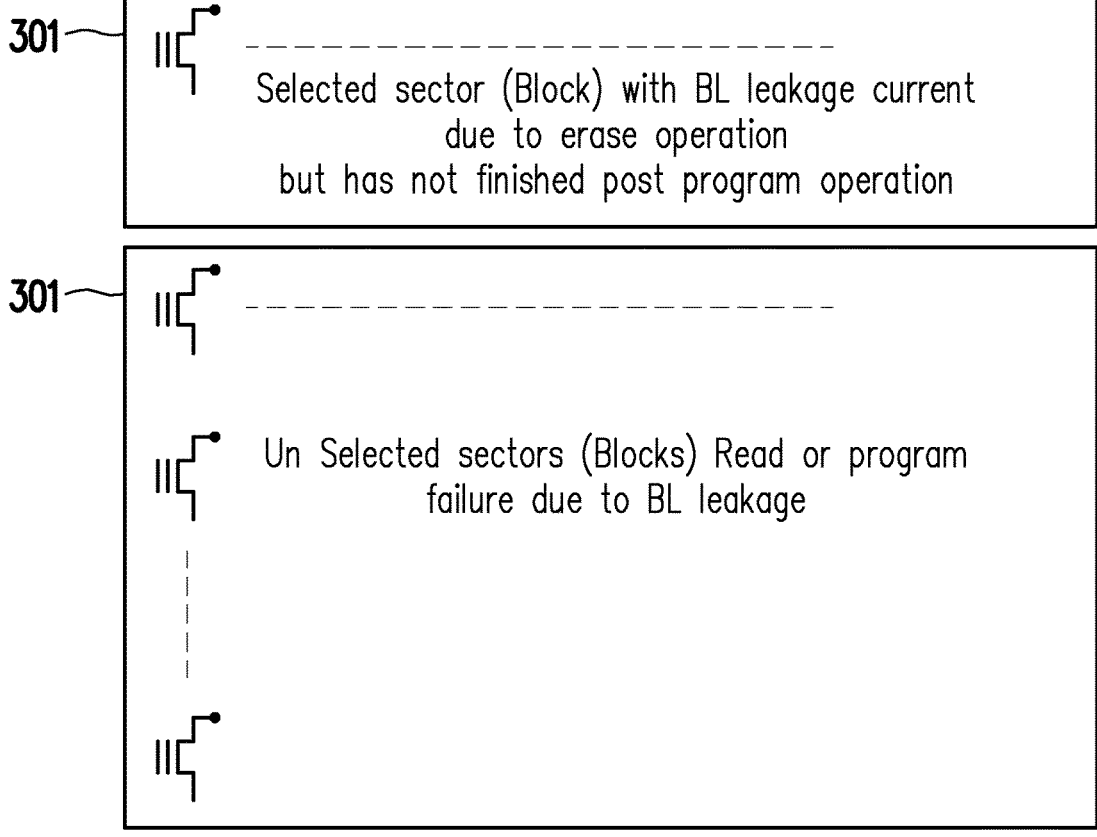
FIG. 2 shows an issue of leakage current of a selected block of memory cells for erase causing read or program failures for un-selected blocks of memory cells sharing the same bitline.

Reference will now be made in detail to the present exemplary embodiments of the disclosure, examples of which are illustrated in the accompanying drawings. Wherever possible, the same reference numbers are used in the drawings and the description to refer to the same or like parts.

The disclosure provides an erase method of a memory device by performing an erase procedure which contains an erase verifying scheme and a post program verifying scheme in an interleaving manner. The erase method is aimed to perform an erase operation effectively and to minimize leakage current. The disclosure also provides a memory device which utilizes the erase method.

The concepts of the disclosure are described as follows. After receiving an erase command, an erase condition is applied to erase a block of memory cells, then a first erase verification procedure is performed for the block of memory cells in comparison with a first erase verify voltage. In detail, in the first erase verification procedure, a test voltage or current is applied to determine whether the threshold voltage distribution of the block of memory cells is lower than the first erase verify voltage. If it is determined that the threshold voltage distribution of the block of memory cells is lower than the first erase verify voltage, it means that the first erase verification procedure is passed, then a second erase verification procedure is performed for the block of memory cells in comparison with a second erase verify voltage. If it is determined that the threshold voltage distribution of the block of memory cells is lower than the second erase verify voltage, it means that the second erase verification procedure is passed, then a post program verification procedure is performed to detect whether there are any cells in the block of memory cells being over-erased by applying a post program verify voltage to the block of the memory cells.

If it is determined that the threshold voltage distribution of the block of memory cells is higher than the post program verify voltage, it means that the post program verification procedure is passed, then it is determined that whether the post program verify voltage and the second erase verify voltage reach a final post program verify voltage and a final erase verify voltage, respectively. The second erase verify voltage is between the final erase verify voltage and the first erase verify voltage. If the post program verify voltage and the second erase verify voltage reach a final post program verify voltage and a final erase verify voltage, respectively, it means that the erase operation is completed.

If the post program verify voltage and the second erase verify voltage do not reach the final post program verify voltage and the final erase verify voltage, respectively, the post program verify voltage and the second erase verify voltage will be adjusted with step voltages to be or be closer to the final post program verify voltage and the final erase verify voltage, and the flow will be back to apply the erase condition again. In other words, the erase verify voltages and the post program verify voltage which are not the final ones serve as intermediate targets for determining whether an erase operation is on track since it is possible that some cells are damaged and cannot be erased.

If the erase verification procedure (for example, the first erase verification procedure or the second erase verification procedure) is not passed, then the erase condition can be changed. For example, bias voltage of the erase pulse could be made stronger (e.g. more negative) or more erase pulses would be applied. For example, the erase condition may be a single erase pulse, if the erase verification procedure (for example, the first erase verification procedure or the second erase verification procedure) is not passed, then the number of erase pulses which have been applied before passed (hereinafter referred to as "erase pulse loop count") is counted and compared with an expected number (ex. 5). If the erase pulse loop count is not larger than the expected number, then the flow will be back to apply the same erase condition again. On the other hand, if the erase pulse loop count is larger than the expected number, then erase bias voltage of the erase pulse will be adjusted to be stronger, and then the flow will be back to apply the adjusted erase pulse.

In detail, if it is determined that a portion of the threshold voltage distribution of the block of memory cells is higher than the first erase verify voltage, it means that the first erase verification procedure is failed, and if the erase pulse loop count is larger than the expected number, the erase condition will be adjusted to be stronger and then be applied to the block of memory cells until the first erase verification procedure is passed. The erase condition is typically applied to the word line of the block of cells.

Before the final post program verify voltage has been reached, one or more slightly higher post program verify voltage(s) could be applied to determine whether some erased cells near the tail end of the threshold voltage distribution are lower than the higher post program verify voltage, if so, it may indicate that the erased cells closed to have over erased, which may result in leakage current. If some erased cells are lower than the higher post program verify voltage, a post program procedure is performed as an attempt to increase the threshold voltage of the erased cells near the tail end of the threshold voltage distribution and to reduce the amount of leakage current. The purpose of the higher post program verify voltage functions as a buffer before leakage current actually occurs. The above described post program procedure is currently known and is not a focus on the disclosure.

During the erase operation, the erase condition may be adjusted according to a first step level and a second step level smaller than the first step level. The first step level is configured to allow the threshold voltage distribution of the block of cells to reach the corresponding erase verify voltage quicker, but after leakage current has been detected by the post program verification procedure, the second step level is adopted to avoid overly erasing the block of cells. In an alternative embodiment, when some erased cells are lower than the higher post program verify voltage, that is, the post program verification procedure is failed, only partial cells in the block of cells is erased before the post program procedure. The partial cells can be some cells from each sector in the block or can be one byte in the block. In another alternative embodiment, when the post program verification procedure is failed, the subsequent erase condition may keep the same or be reduced.

The erase condition (ex. bias voltage) could be adjusted after each erase verify voltage reached. However, before an erase verify voltage has been reached, the erase condition may not be adjusted until greater than the expected number. Changing the erase bias voltage may decrease the number of erase pulses being applied so as to minimize the degradation of a cell. Also, the proper balance between the number of erase pulses and the adjustment of the erase bias voltage could be optimized to increase the erase speed and to avoid a cell being overly erased.

The post program verify voltage and the final post program verify voltage may be performed by bit line (column), therefore it would not take longer time compared to the conventional art. The post program verify voltage and the final post program verify voltage could have different bit line bias voltages or could be used in a sense amplifier circuit to detect more than one bit line currents or higher word line voltage levels.

In order to implement the above described concepts, the disclosure provides an erase method for a memory device as well as a memory device that uses the erase method. FIG. 3 shows an erase method for a memory device. Please note that what has been described above may also be applied to this embodiment, and may not be described again. In step S401, the memory device receives an erase command. In step S402, an erase condition is applied to erase a block of memory cells of the memory device. In step S403, a first erase verification procedure is performed on the block of memory cells in order to verify whether a threshold voltage distribution of the block of memory cells has reached a first erase verify voltage. In step S404, a second erase verification procedure is performed on the block of memory cells reached the first erase verify voltage in order to verify whether a threshold voltage distribution of the block of memory cells has reached a second erase verify voltage. In step S405, the memory device would perform a post program verification procedure to detect whether the block of memory cells reached the second erase verify voltage are close to being overly erased according to a post program verify voltage. In step S406, if the post program verification procedure is passed, then the memory device may determine whether the post program verify voltage and the second erase verify voltage reach a final post program verify voltage and a final erase verify voltage, respectively. The second erase verify voltage is between the final erase verify voltage and the first erase verify voltage. In step S407, the memory device may finish the erase operation when the post program verify voltage and the second erase verify voltage reach the final post program verify voltage and the final erase verify voltage, respectively. Otherwise, in step S408, the memory device may adjust the post program verify voltage and the second erase verify voltage, and the flow will go back to step S402 but adopting the adjusted post program verify voltage and the adjusted second erase verify voltage in the subsequent corresponding steps.

According to an exemplary embodiment, the memory device may apply a plurality of erase pulses (which is one example of the erase condition) in response to having determined that the block of memory cells has failed an iteration of the erase verification procedure (for example, the first erase verification procedure or the second erase verification procedure). Similarly, the memory device may also adjust the erase condition from a first erase bias voltage to a second erase bias voltage in response to having determined that the block of memory cells has failed an iteration of the erase verification procedure. The memory device may also apply both of the above described measures in response to having determined that the block of memory cells has failed an iteration of the erase verification procedure. Moreover, the memory device may apply a third erase bias voltage in response to block of memory cells not passing another iteration of the erase verification procedure. A step level between the first erase bias voltage and the second erase bias voltage could be equal to the step level between the second erase bias voltage and the third erase bias voltage in order to reach different erase verify voltages in a linearly manner.

Figure 4:
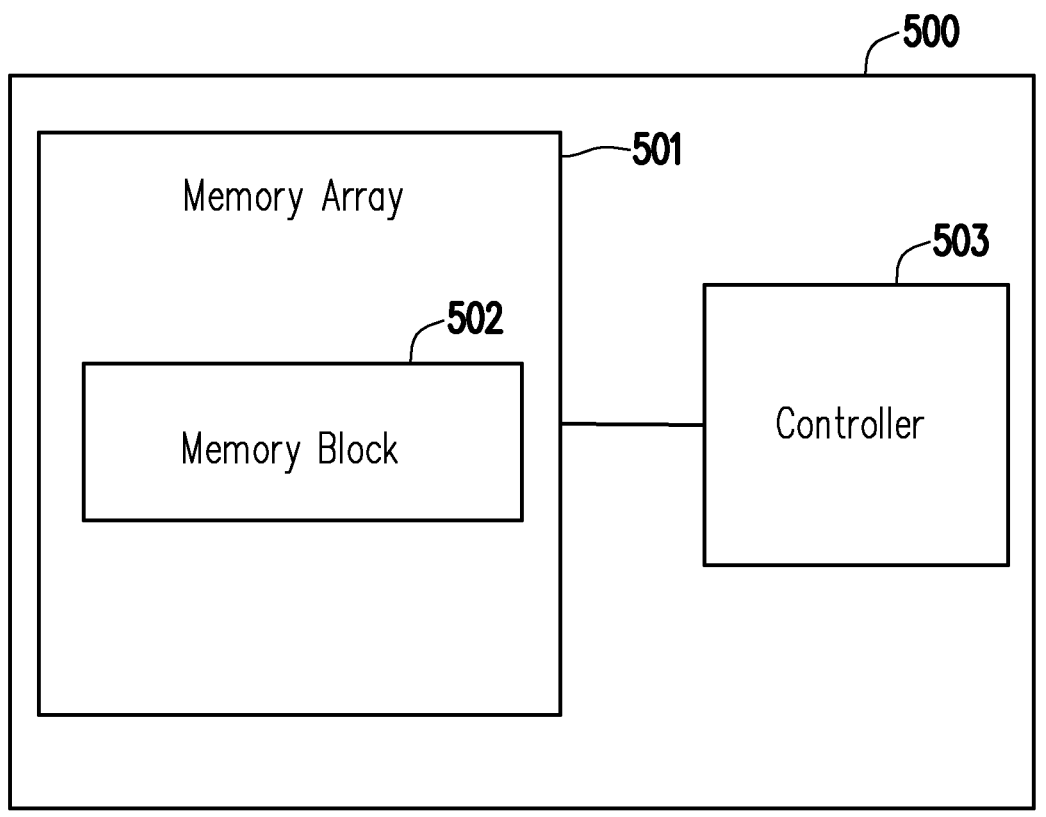
FIG. 4 illustrates a memory device that uses the erase method according to an exemplary embodiment of the disclosure.

FIG. 4 shows a memory device with hardware blocks that are most relevant for the disclosure. The memory device 500 would include not limited to a memory array 501 controlled by a memory controller 503 for storing digital binary information. The memory array 501 may contain a plurality of memory banks, and each memory bank may contain a memory block 502. The structure of the memory block 502 could be implemented in various ways such as the memory block 1301 of FIG. 13, but the disclosure does not limit to a specific implementation. The memory controller 503 is electrically connected to the memory array 502 and is configured to control the memory array 502 to implement the erase method as described in FIG. 4 and in subsequent exemplary embodiments.

Figure 5:
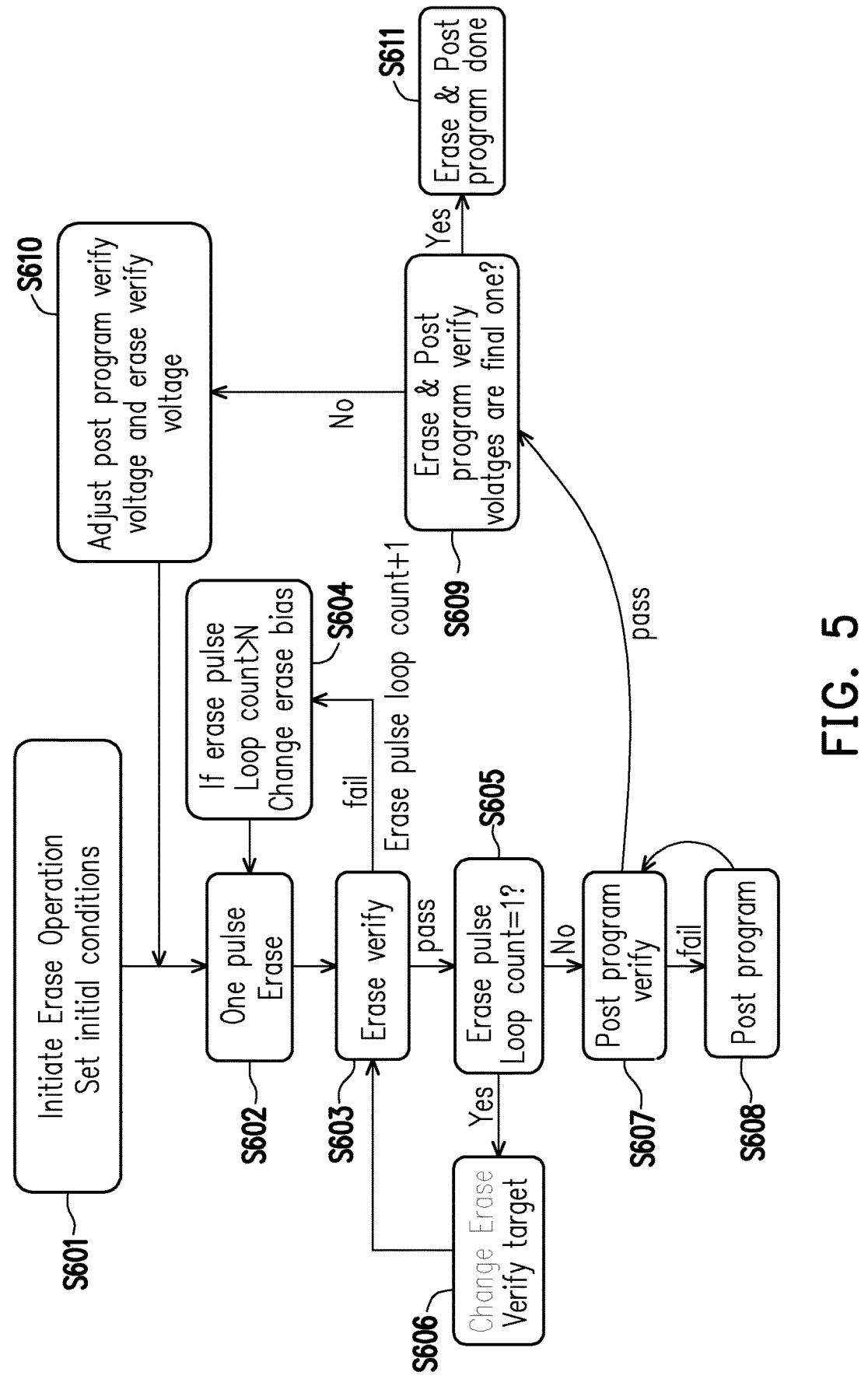
FIG. 5 illustrates the erase method with further details according to an exemplary embodiment of the disclosure.

To further elucidate the erase method 400 and the memory device 500, the disclosure provides exemplary embodiments as shown in FIG. 5~FIG. 13 and as described in their corresponding written descriptions. FIG. 5 shows an exemplary embodiment of the disclosure of the erase method of FIG. 3. Please note that what has been described above may also be applied to this embodiment, and may not be described again. Referring to FIG. 5, in step S601, after receiving an erase command, the memory device would initiate an erase operation to erase a block of memory cells, and initial conditions include a first erase bias voltage, a first erase verify voltage, and a first post program verify voltage are set. In step S602, the memory device would apply a single erase pulse as the erase condition to the block of memory cells. In step S603, the memory device would perform a first erase verification procedure by measuring a threshold voltage distribution of the block of memory cells and based on whether the threshold voltage distribution is entirely lower than the first erase verify voltage. If the threshold voltage distribution is not entirely lower than the first erase verify voltage, it means that the first erase verification procedure has failed. If the threshold voltage distribution is entirely lower than the first erase verify voltage, it means that the first erase verification procedure has passed.

In response to the first erase verification procedure having been failed, in step S604, the memory device may change the erase bias voltage of the erase condition being applied to the word line of the block of memory cells to be more negative if the erase pulse loop count has exceeded an expected number N. The expected number N is a positive integer, and could be, for example, 5, but the disclosure does not limit the expected number N to any particular number. If the erase bias voltage has been changed, the erase pulse loop count is reset to 0. In response to the first erase verification procedure having been passed, in step S605, the memory device would determine whether the erase pulse loop count is 1, if yes, then adjust the first erase verify voltage to a second erase verify voltage which could be or closer to a final erase verify voltage. In this embodiment, the second erase verify voltage can be lower than the first erase verify voltage. It should be noted that, the step level between the first erase verify voltage and the second erase verify voltage could be larger in order to complete the erase operation quicker, and the step level among subsequent erase verify voltages could be made to be gradually smaller.

In step S607, the memory device may perform a post program verification procedure to determine whether to perform a post program operation. Besides, in step S607, the memory device may clear the erase pulse loop count to be zero. The post program verification procedure may involve determining whether a threshold voltage distribution of the block of memory cells is entirely greater than a first post program verify voltage which is higher than a final post program verify voltage. If the threshold voltage distribution of the block of memory cells is not entirely greater than the first post program verify voltage, it means that the post program verify procedure has failed. If the threshold voltage distribution of the block of memory cells is entirely greater than the first post program verify voltage, it means that the post program verify procedure has passed. If the post program verify procedure has failed, then in step S608, the memory device would perform a post program operation. If the post program verify procedure has passed, then in step S609, the memory device would determine whether the current erase verify voltage and the current post program verify voltage are the same as a final erase verify voltage and a final post program verify voltage. The final erase verify voltage and the final post program verify voltage are both predetermined target voltages. If yes, then in step S611, the erase operation is finished. If no, then in step S610, the memory device would adjust the first post program verify voltage and the second erase verify voltage to be or be closer to the final post program verify voltage and the final erase verify voltage, respectively, and the flow will be back to the step S602 but using the adjusted post program verify voltage and the adjusted erase verify voltage. Besides, in step S610, the memory device may further change the post program bias voltage and use the changed post program bias voltage in the step S608 of the next iteration. In an embodiment, in the step S610, the post program verify voltage is changed if the erase verify voltage is the final erase verify voltage, and the erase voltage verify voltage is changed if the erase voltage verify voltage is not the final erase verify voltage.

Figures 6A, 6B:
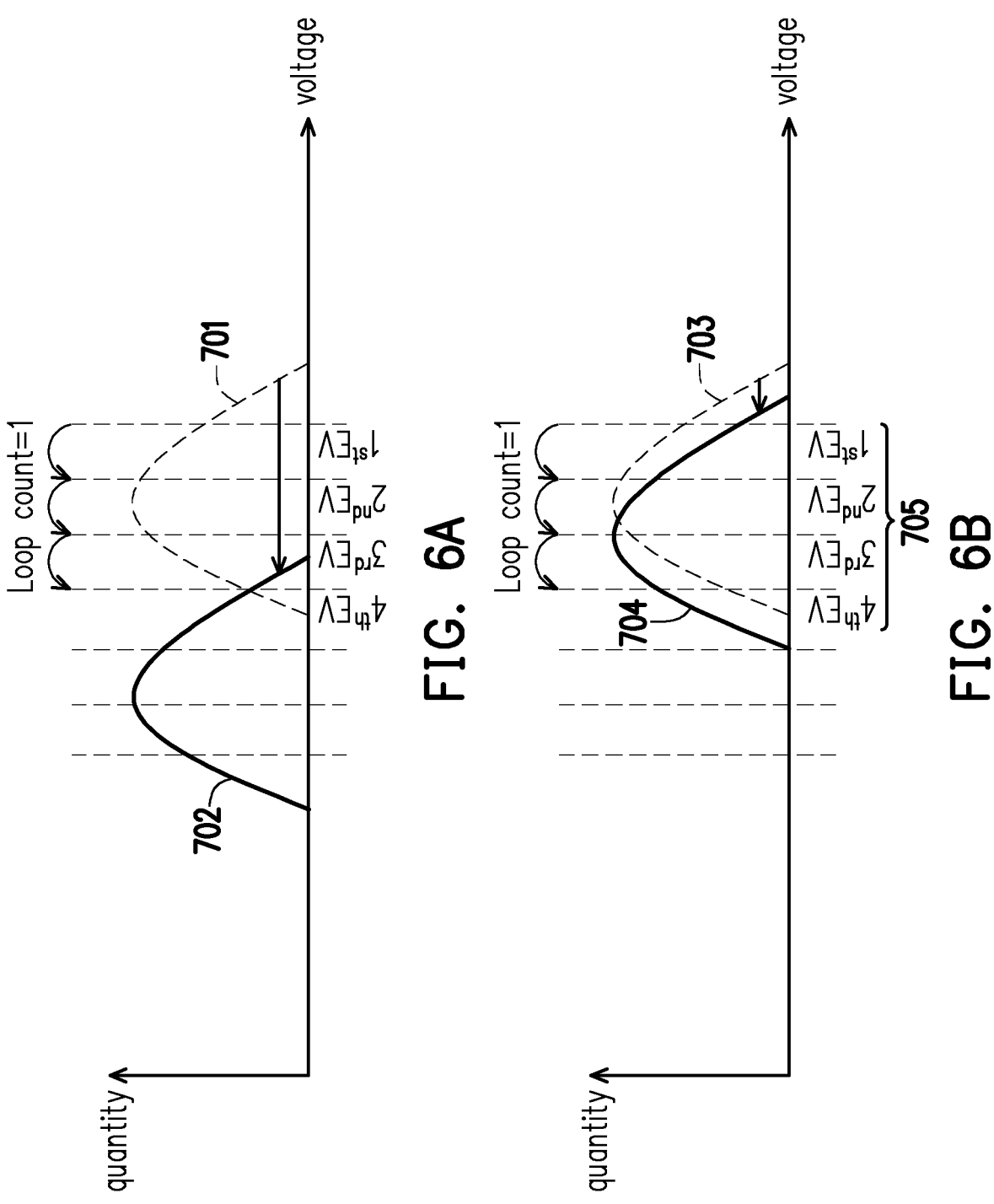
FIG. 6A shows changes of threshold voltage distributions passing the third erase verification procedure after applying one erase pulse according to an exemplary embodiment of the disclosure.
FIG. 6B shows changes of threshold voltage distributions which did not pass the first erase verification procedure after the erase pulse loop count has exceeded the expected number according to an exemplary embodiment of the disclosure.

FIG. 6 serves to explain steps S601~S606 of the exemplary embodiment of FIG. 5 with further illustrations. In FIG. 6, the vertical dotted lines are various erase verify voltages 705 (e.g. $1^{st}$ EV, $2^{nd}$ EV, $3^{rd}$ EV, $4^{th}$ EV . . . ) which are not the final erase verify voltage, the X axis is voltage and the Y axis is quantity. In FIG. 6A it can be seen that the initial threshold voltage distribution 701 of the block of memory cell before applying any erase pulse is not entirely lower than the first erase verify voltage ($1^{st}$ EV). After applying one erase pulse (e.g. S602), the initial threshold voltage distribution 701 is moved to a second threshold voltage distribution 702 which would successfully pass the third erase verification procedure (e.g. S603). In other words, the threshold voltage distribution has shifted to below the third erase verify voltage ($3^{rd}$ EV) in response to just one erase pulse. Accordingly, a loop from step S603 to step S606 is performed three times to change the erase verify voltage from the $1^{st}$ EV to $4^{th}$ EV. Subsequently, since the second threshold voltage distribution 702 would not pass the fourth erase verification procedure, the memory device would perform step S602 to apply another single erase pulse, which causes the erase pulse loop count equal to 2. Then, assuming that the second threshold voltage distribution 702 is shifted to below the fourth erase verify voltage ($4^{th}$ EV) in response to the another single erase pulse, since the erase pulse loop count is not 1, the memory would perform step S607.

In FIG. 6B, the initial threshold voltage distribution 703 of the block of memory cell before applying any erase pulse is not entirely lower than the first erase verify voltage ($1^{st}$ EV). In this embodiment, after a number of iterations from step S602 to step S604, the erase pulse loop count has exceeded the expected number N, but the second threshold voltage distribution 704 still did not pass the first erase verification procedure. Accordingly, the memory device may change the erase bias voltage being applied to the word line of the block of memory cells by making it stronger (i.e. more negative) in step S604.

Figure 7:
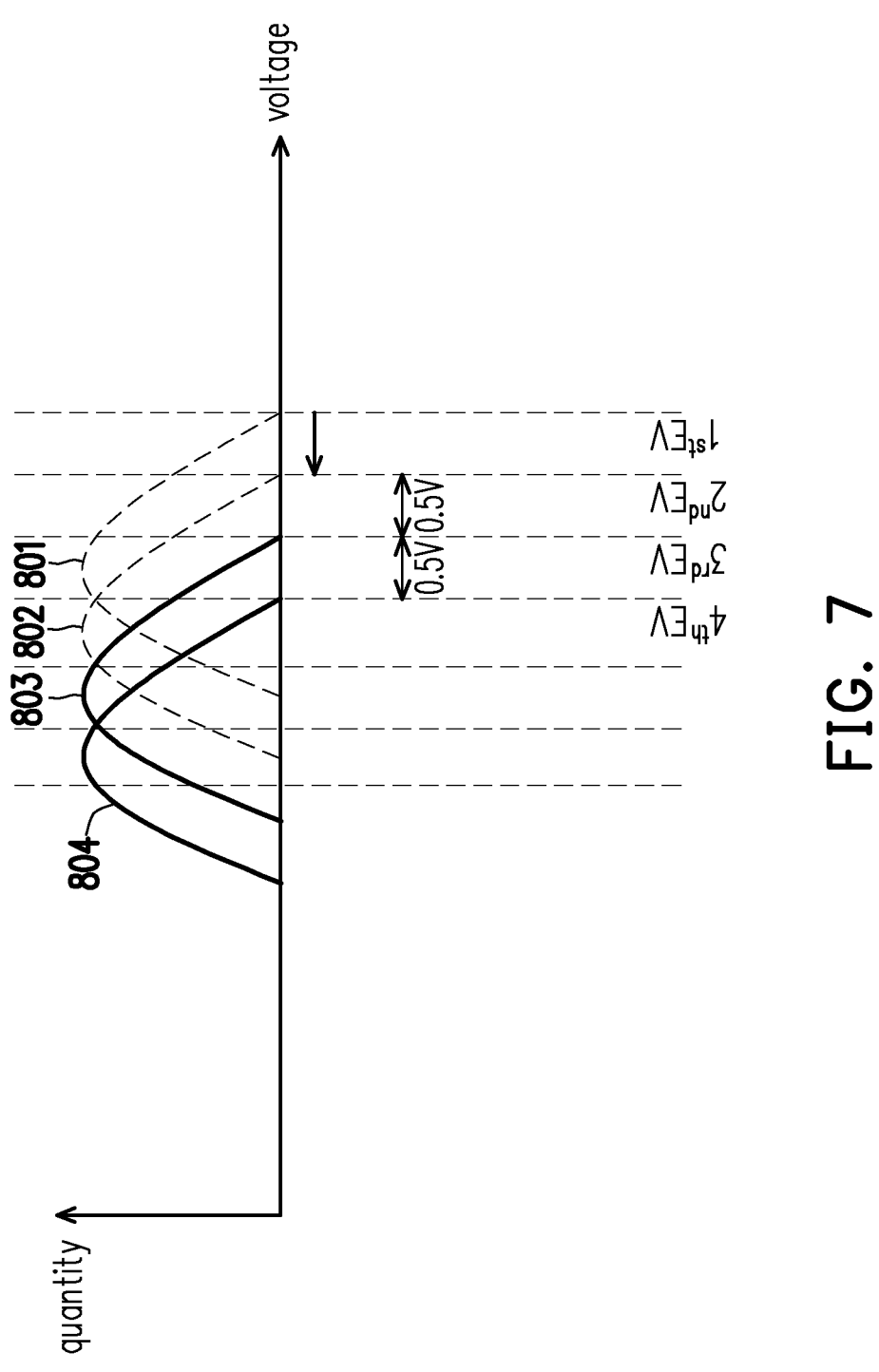
FIG. 7 illustrates a diagram of maintaining the erase speed regardless of the number of erase cycles according to an exemplary embodiment of the disclosure.

Referring to FIG. 7, there are four threshold voltage distributions 801, 802, 803, 804 of the same block of memory cells as the result of performing the first erase verification procedure, the second erase verification procedure, the third second erase verification procedure, and the fourth erase verification procedure in order. To ensure each erase verification procedure can be passed within the expected number N of the erase pulse loop count, the erase bias voltage can be adjusted, for example, −0.5 volt, after the threshold voltage distribution has reached each erase verify voltage. In this way, by applying a combination of more erase pulses as well as increasing the erase bias voltage, the speed of the erase operation could be increased, and the cell degradation could be compensated, thereby the erase time of the fresh block is close to that of the cycling block, and the erase speed is closed to linear with time.

Figure 8:
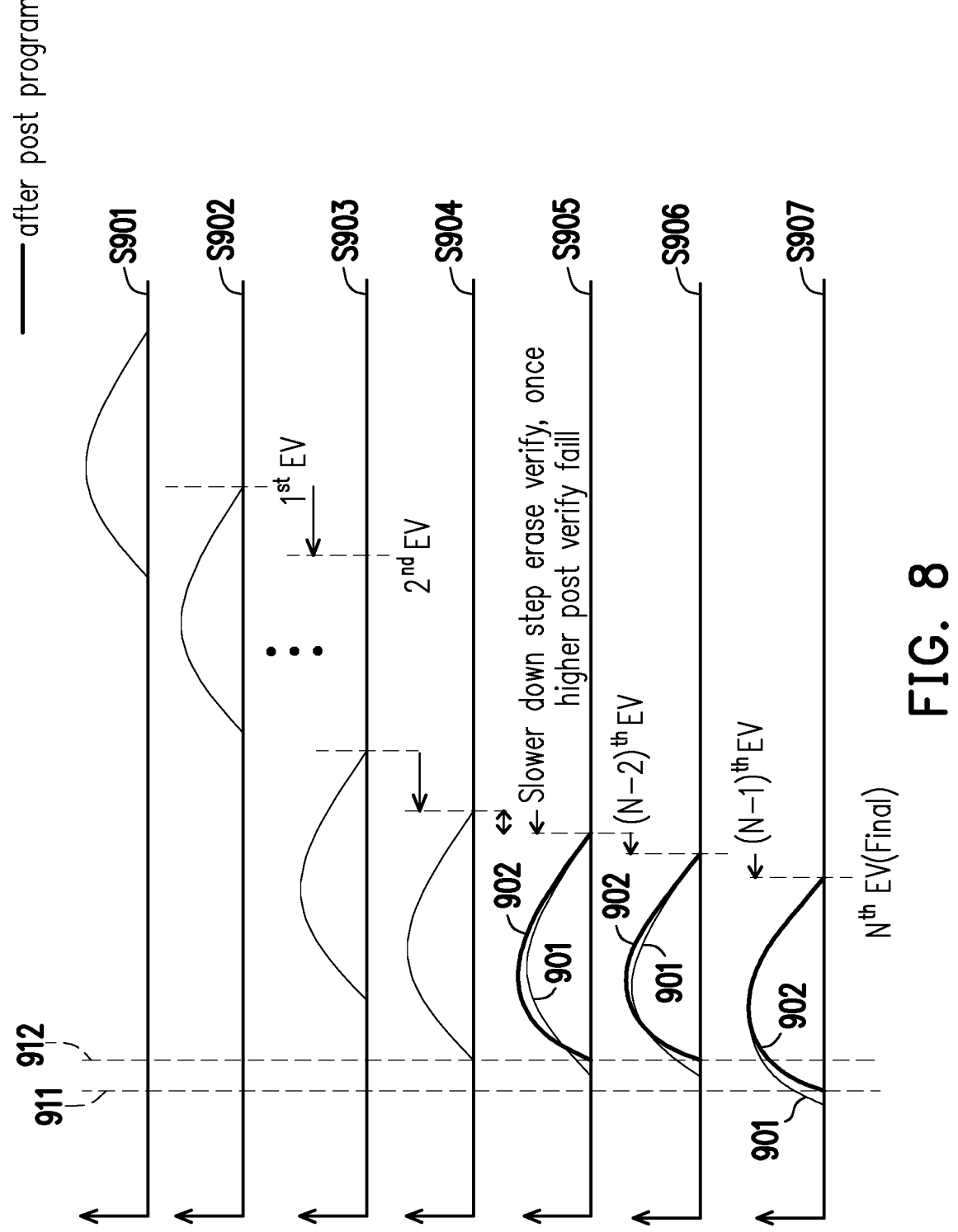
FIG. 8 illustrates changes of threshold voltage distributions in various steps according to an exemplary embodiment of the disclosure.

FIG. 8 illustrates changes of threshold voltage distributions in various stages of the erase method with reference of FIG. 5. In stage S901, which is before the step S601, a block of memory cells having a first threshold voltage distribution is to be erased. In stage S902, in response to the step S603 being passed, the first threshold voltage distribution is moved to the second threshold voltage distribution which meets a first erase verify target (e.g. moved to entirely lower than $1^{st}$ EV). In stage S903, after several iterations of the steps of FIG. 5, the threshold voltage distribution is close to a higher post program verify voltage 912. As shown, the higher post program verify voltage 912 is between the first erase verify target ($1^{st}$ EV) and the final post program verify voltage 911. In stage S904, after several iterations of the steps of FIG. 5, the threshold voltage distribution is still between the higher post program verify voltage 912 and a certain erase verify voltage. In stage S905, a tail of the threshold voltage distribution 901 is lower than the higher post program verify voltage 912 in response to the step S607 being failed, then an iteration of the post program procedure (e.g. S608) and the step S607 is performed to shift the threshold voltage 901 to the threshold voltage 902, which is between the higher post program verify voltage 912 and the certain erase verify voltage. In one embodiment, the erase verify voltage may be adjusted according to a first step level and a second step level smaller than the first step level. After leakage current has been detected by the post program verification procedure (i.e., step S607 is failed), the second step level is adopted to slow down the change step of erase verify voltage. Stage S906 is similar to the stage S905, but the threshold voltage 902 is narrowed after several iterations of the steps of FIG. 5. In stage S907, it indicates that the threshold voltage distribution 901 has been shifted to the threshold voltage distribution 902 where is between the final post program verify voltage 911 and the final erase verify voltage Nth EV (final) after several iterations of the steps of FIG. 5, and the erase procedure is considered complete (e.g. S611). As shown, the next erase verify voltage (for example, $2^{nd}$ EV) is closer to the final post program verify voltage 911 than that of the current erase verify voltage (for example, $1^{st}$ EV), thereby gradually moving the threshold voltage distribution to be between the final post program verify voltage 911 and the final erase verify voltage Nth EV (final).

According to an exemplary embodiment of the disclosure, the erase method could be applied to a portion of a block of memory cells under some circumstances such as when the leakage current is too high or when the threshold voltage distribution cannot be moved easily. When only a portion of a block of memory cells is erased at a time, the erase method of FIG. 3 and FIG. 5 may also apply, but a modified version may also be applicable.

Figures 9A, 9B:
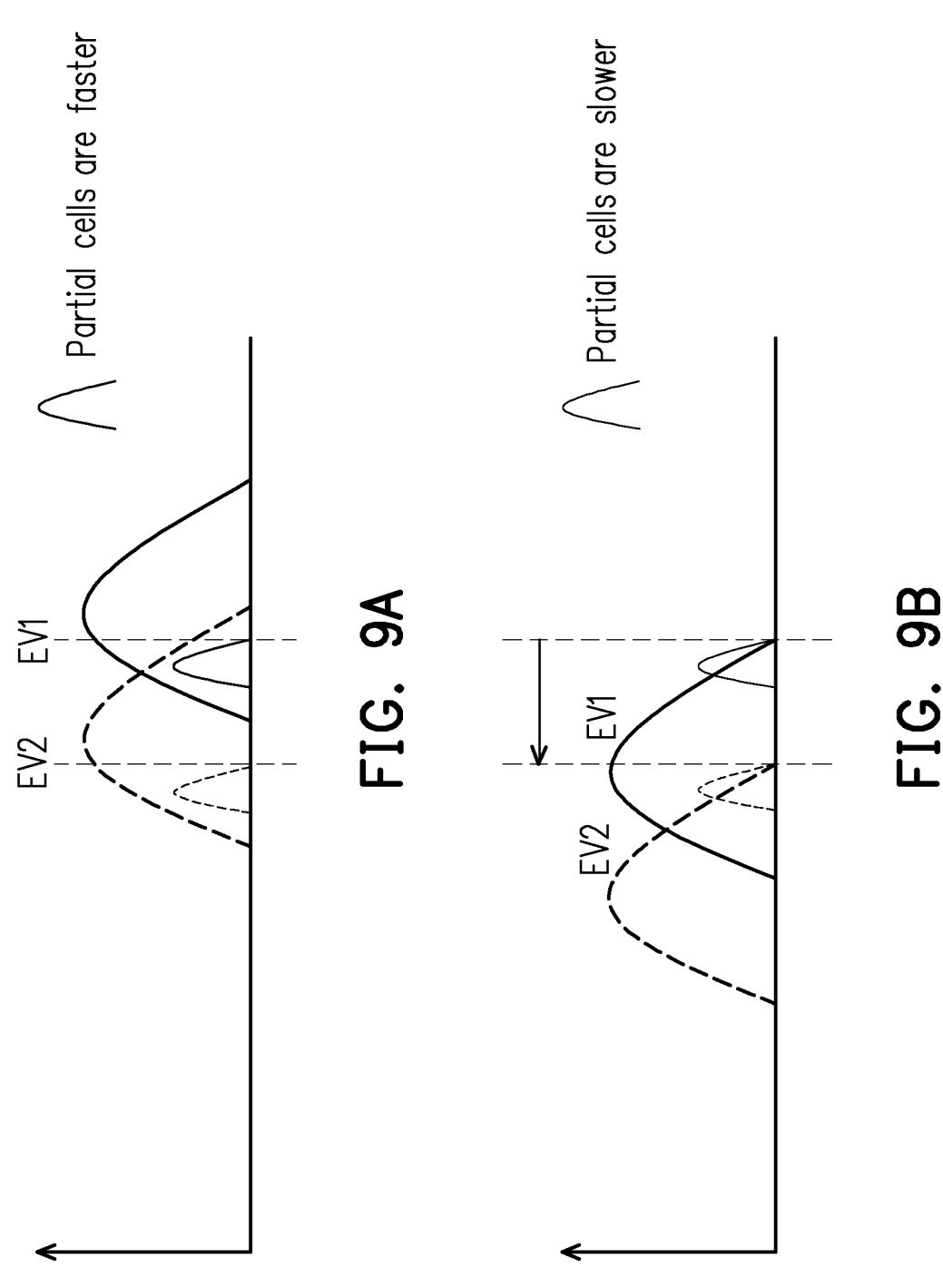
FIG. 9A shows the shifts of threshold voltage distributions for partial faster cells compared to the entire block of memory cells after applying the erase condition to the entire block of memory cells according to an exemplary embodiment of the disclosure.
FIG. 9B shows the shifts of threshold voltage distributions for partial slower cells compared to the entire block of memory cells after applying the erase condition to the entire block of memory cells according to an exemplary embodiment of the disclosure.

FIGS. 9A & 9B each shows the shifts of threshold voltage distributions for partial faster cells and partial slower cells compared to the entire block of memory cells after applying the erase condition to the entire block of memory cells. In FIG. 9A, it shows that the threshold voltage distribution of portion of memory cells move faster (i.e., partial faster cells) relative to the rest of the entire block of memory cells, and thus when the partial faster cells have passed erase verify targets (e.g. EV1, EV2, etc), the threshold voltage distribution of the entire block of memory cells would not. For FIG. 9B, it shows that the threshold voltage distribution of portion of memory cells move slower (i.e., partial slower cells) relative to the rest of the entire block of memory cells, and thus when the partial slower cells have passed erase verify targets (e.g. EV1, EV2, etc), most of the threshold voltage distribution of the entire block of memory cells would have gone too far from the current erase verify target, which means that many of the memory cells may experience overly erased in the future when always erasing the entire block of memory cells.

Figures 10A, 10B:
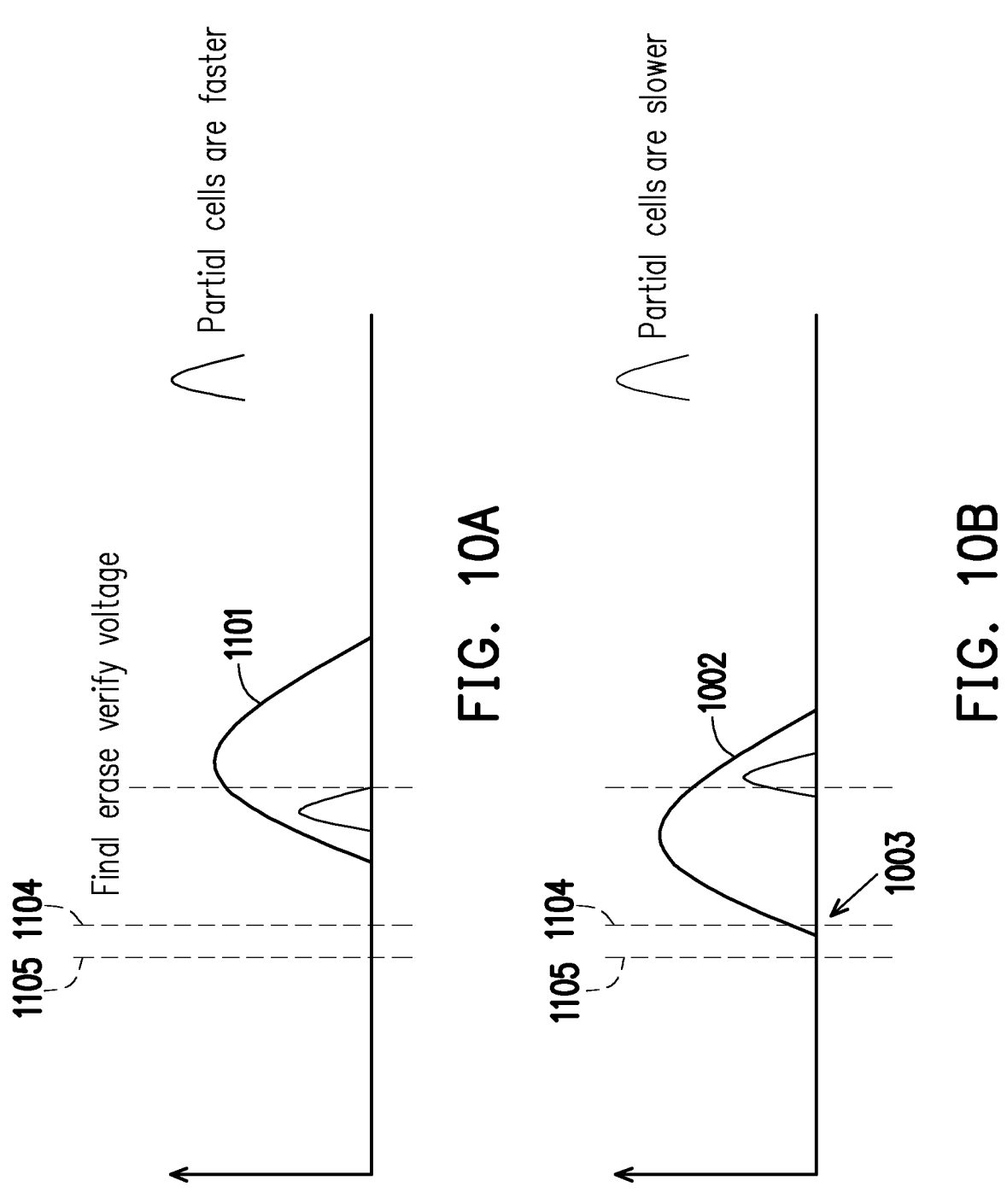
FIG. 10A and FIG. 10B each illustrates a diagram of performing a post program verification procedure on a partial number of cells of a block according to an exemplary embodiment of the disclosure.
Figure 11:
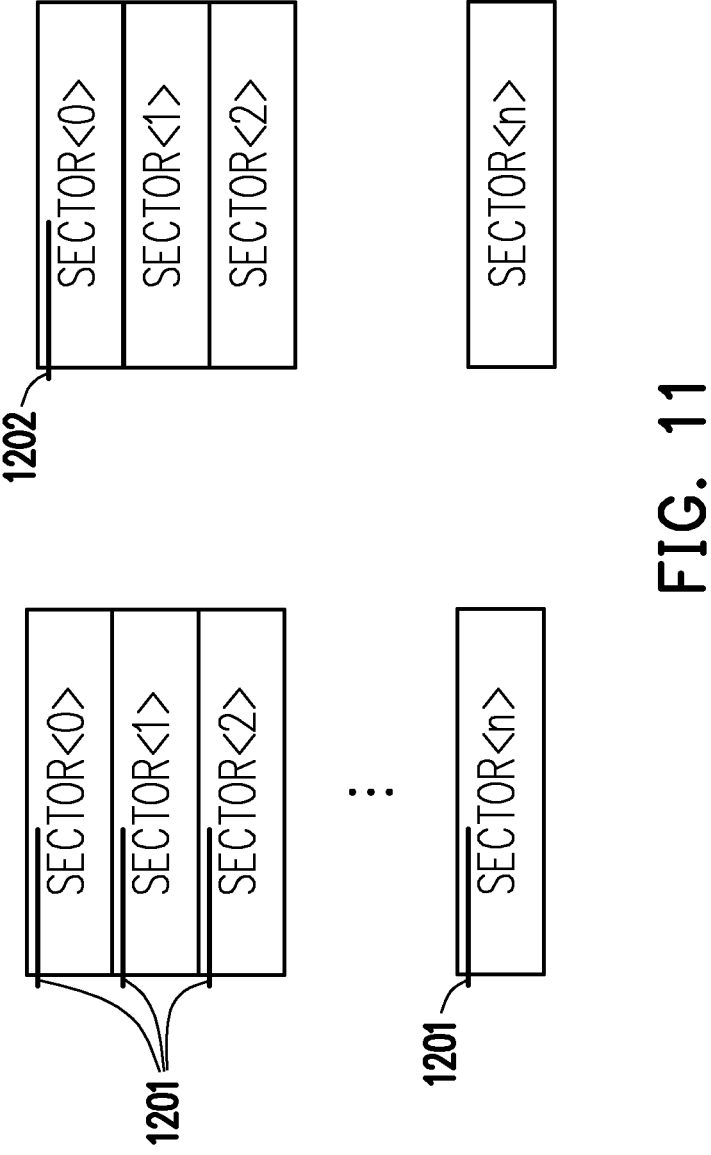
FIG. 11 illustrates a concept of partial cells according to an exemplary embodiment of the disclosure.

FIG. 10A & FIG. 10B each illustrates a second embodiment of an erase method with slightly modified erase verification procedures. Only the differences from the previous embodiments will be described below, that is, the same parts as the previous embodiments will not be repeated. In the second embodiment, the first erase verification procedure is performed for a portion of a block of memory cells (for example, as illustrated in FIG. 11, preferably partial faster cells) rather than the entire block of memory cells. In detail, in the first erase verification procedure, a test voltage or current is applied to determine whether the threshold voltage distribution of the portion of the block of memory cells is lower than the first erase verify voltage. If it is determined that the threshold voltage distribution of the portion of the block of memory cells is lower than the first erase verify voltage, it means that the first erase verification procedure is passed. Similar, the second erase verification procedure and the following erase verification procedure(s) are performed for the portion of the block of memory cells rather than the entire block of memory cells. However, when the memory device determines that the current erase verify voltage is the final erase verify voltage, but the current post program verify voltage is not the final post program verify voltage 1105 in the step S609, the memory device would then perform an erase verification procedure for the entire block of memory cells in comparison with the final erase verify voltage before the step S610. If the threshold voltage distribution of the block of memory cells is entirely lower than the final erase verify voltage, the flow will go to the step S610. In FIG. 10A it shows that the threshold voltage distribution of the faster memory cells is lower than the final erase verify voltage while the threshold voltage distribution 1101 of the entire block of memory cells is not, then the flow will go to the step S602.

Moreover, in the second embodiment, in the step S607, the post program verify procedure includes determining whether a threshold voltage distribution of the block of memory cells is entirely greater than the first post program verify voltage 1104, if no, the post program verify procedure will further include determining whether a threshold voltage distribution of a portion of a block of memory cells (for example, as illustrated in FIG. 11, preferably partial slower cells) is greater than a first post program verify voltage 1104, if yes (as shown in FIG. 10B), then following modification can be applied. In an embodiment, the erase condition, for example, the erase bias voltage can be reduced in the step S610. In another embodiment, the erase condition, for example, the erase target can be changed from the entire block of memory cells to the partial slower cells in the step S610, such that the erase pulse is only applied to the partial slower cells rather than the entire block of memory cells. In an alternative embodiment, the erase condition, for example, the step level for changing the erase bias voltage can be reduced in the step S610.

It is worth noting that, as shown in FIG. 11, while entire block of memory cells may include multiple sectors, a portion of memory cells could be defined as some memory cells 1201 from each sector in one block or just one byte of memory cells 1202 in a sector in one block.

According to the second embodiment, the time of the erase method can be reduced, and it can prevent overly erasing the memory cells.

Figure 12:
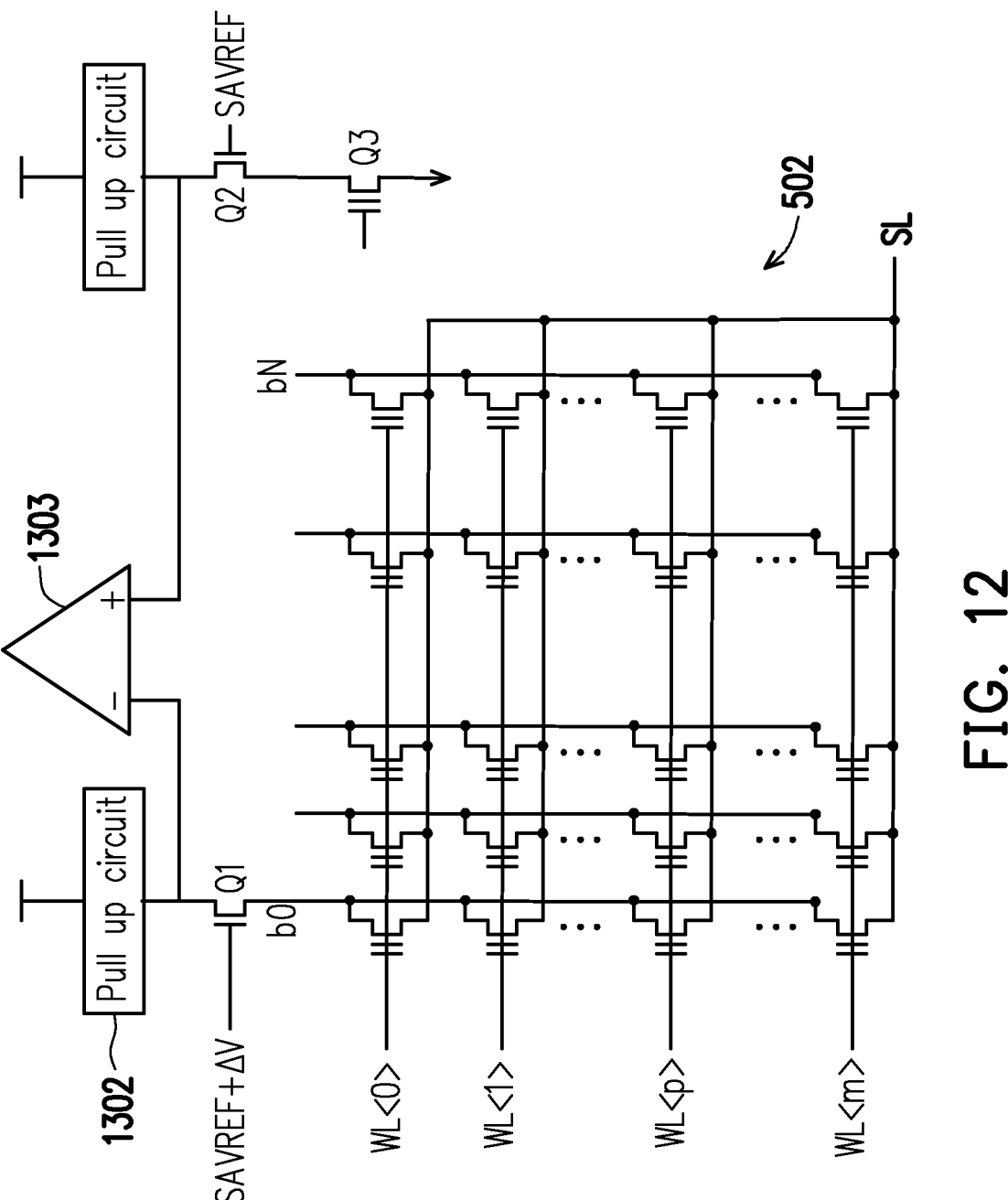
FIG. 12 illustrates a more detailed circuit diagram of a memory device erasing a block of cells according to an exemplary embodiment of the disclosure.
Figure 13:
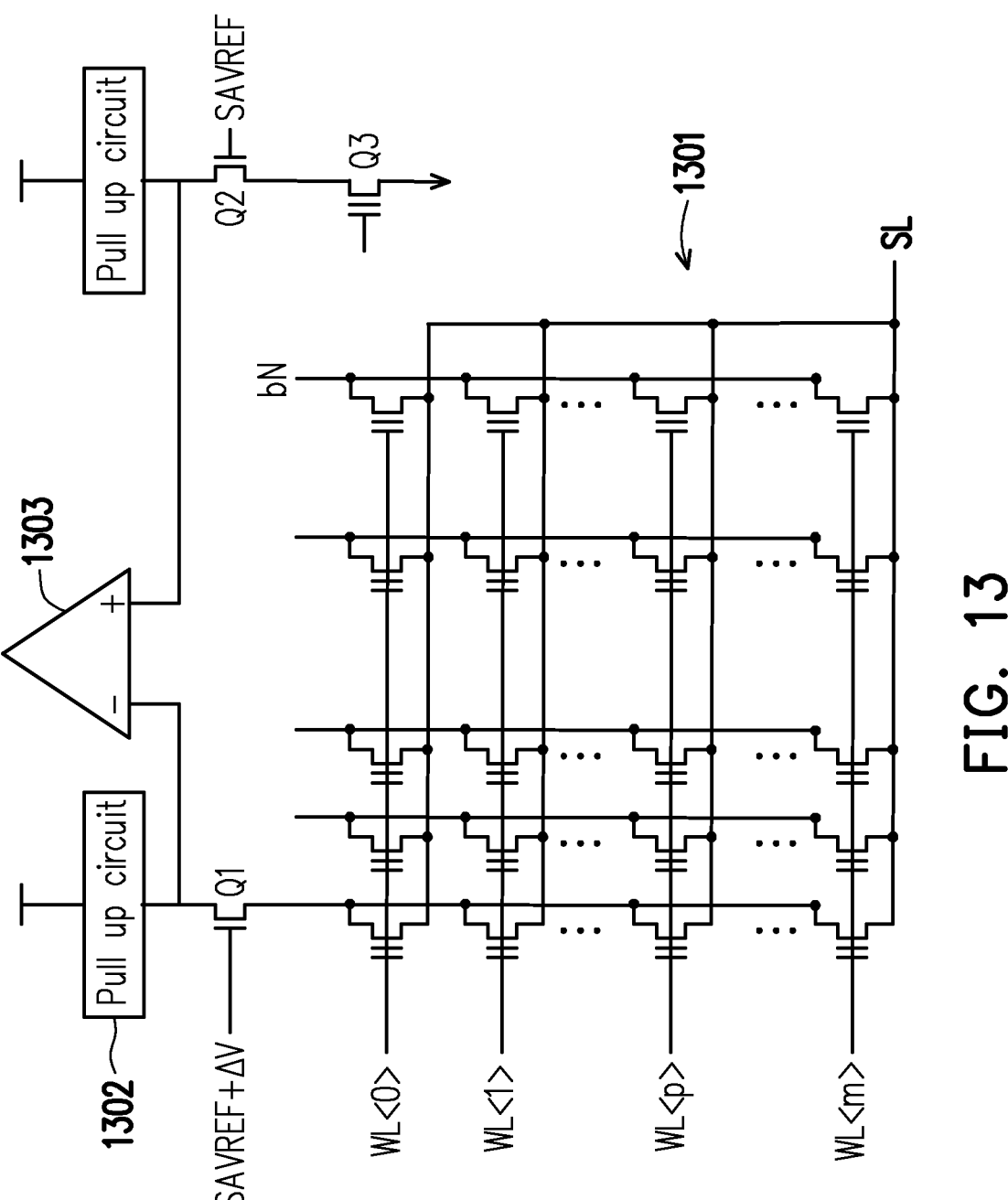
FIG. 13 illustrates the memory device detecting leakage current while erasing a block of cells according to an exemplary embodiment of the disclosure.

FIG. 12 and FIG. 13 each shows a circuit diagram of a memory block 502 for implementing the erase method. The flash memory device 1300 includes a memory array 501 having at least one memory block 502 and a sense amplifier circuit including a first transistor Q1, a second transistor Q2, a reference memory cell Q3, and an operational amplifier 1303. One of drain or source terminal of the first transistor Q1 could be connected to a voltage pull up circuit and the other could be connected to a bit line (one of b0 to bN). Also, one of drain or source terminal of the second transistor Q2 could be connected to a voltage pull up circuit and the other could be connected to a bit line. The operational amplifier 1303 receives the voltage differences from the output of the first transistor Q1 and the second transistor Q2 and functions as a comparator to compare the bit line current with a reference current which are translated from voltages. The previously described bias erase voltage can be applied to the word lines WL<0>~WL<m>. The input gate voltage for the first transistor Q1 and the second transistor Q2 could be the sense amplifier reference (SAVREF) voltage.

The SAVREF voltage could be added with an offset (ΔV) voltage which is the previously described post program verify voltage. Since a high SAVREF would typically cause leakage current, the offset (ΔV) voltage could be adjust to be higher as the higher post program verify voltage to detect the leakage current. Upon detecting the leakage current above a threshold, the controller (e.g. 503) of the flash memory device 1300 may perform a post program operation. The leakage current of each bit line could be detected individually as shown in FIG. 13. Alternatively, the leakage current of multiple bit lines could be detected together by combining multiple bit lines.

In view of the aforementioned descriptions, the present disclosure is suitable for being used in a memory device and is able to more efficiently erase a block of memory cells by minimizing the leakage current while conserving the number of erase pulses without significantly increase the amount of time needed to erase a block of memory cells. Therefore, the present disclosure provides a green technology by reducing power consumption of the non-volatile memory device. Besides, since reliability and durability of the non-volatile memory device of the present invention are improved, the present invention provides a sustainable non-volatile memory device.

Besides, the non-volatile memory device of the present disclosure may be used on automotive electronics, such as Advanced Driver Assistance Systems (ADAS), Instrument Clusters, Infotainment. The non-volatile memory device of the present disclosure may be used on Industrial applications, such as aerospace, medical, safety equipment, health & fitness, industrial controls, instrumentation, security, transportation, telecommunications, PoS machines, human machine interface, programmable logic controller, smart meter, and industrial networking. The non-volatile memory device of the present disclosure may be used on communication and networking devices such as STB, switches, routers, passive optical networks, xDSL, wireless access point, cable modem, power line communications M2M, mobile phones, base stations, DECT phones, and many other new communication products. The non-volatile memory device of the present disclosure may be used on desktops, notebooks, servers, gaming notebooks, ultrabooks, tablets, convertibles, HDD, and SSD. The non-volatile memory device of the present disclosure may be used on space constrained applications including Wearable, MP3 players, smart watches, games, digital radio, toys, cameras, digital photo album, GPS, Bluetooth and WiFi modules. The non-volatile memory device of the present disclosure may be used on television, display and home electronics.

No element, act, or instruction used in the detailed description of disclosed embodiments of the present application should be construed as absolutely critical or essential to the present disclosure unless explicitly described as such. It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An erase method for a non-volatile memory device comprising:
   initiating an erase operation on a block of memory cells by applying an erase condition;

performing an erase verification procedure on at least a portion of the block of memory cells using an erase verify voltage;
   performing a detection procedure on at least a portion of the block of memory cells using a post program verify voltage between a final erase verify voltage and a final post program verify voltage to detect whether leakage current above a threshold is present in the block of memory cells passed the erase verification procedure;
   iteratively adjusting the erase verify voltage and the post program verify voltage, and repeating the steps of applying the erase condition, performing the erase verification procedure using the adjusted erase verify voltage, and performing the detection procedure using the adjusted post program verify voltage until the adjusted erase verify voltage has reached the final erase verify voltage and the adjusted post program verify voltage has reached the final post program verify voltage; and
   finishing the erase operation when the adjusted erase verify voltage has reached the final erase verify voltage and the adjusted post program verify voltage has reached the final post program verify voltage.

2. The erase method of claim 1,
   wherein performing the erase verification procedure comprises:
      determining whether a threshold voltage distribution of at least the portion of the block of memory cells is lower than the erase verify voltage or the adjusted erase verify voltage;
      having determined that at least the portion of the block of memory cells has passed the erase verification procedure in response to the threshold voltage distribution of at least the portion of the block of memory cells being lower than the erase verify voltage or the adjusted erase verify voltage; and
      having determined that at least the portion of the block of memory cells has failed the erase verification procedure in response to a portion of the threshold voltage distribution of at least the portion of the block of memory cells not being lower than the erase verify voltage or the adjusted erase verify voltage.

3. The erase method of claim 2, further comprising:
   determining whether the adjusted erase verify voltage has reached the final erase verify voltage and whether the adjusted post program verify voltage has reached the final post program verify voltage when the leakage current above the threshold is not present,
   wherein iteratively adjusting the erase verify voltage comprises:
   adjusting the erase verify voltage when an erase pulse loop count is equal to 1, or in response to determining that the adjusted erase verify voltage has not reached the final erase verify voltage and the adjusted post program verify voltage has not reached the final post program verify voltage.

4. The erase method of claim 2, wherein repeating the step of applying the erase condition comprises:
   applying the erase condition to the block of memory cells again in response to having determined that at least the portion of the block of memory cells has failed the erase verification procedure.

5. The erase method of claim 3 further comprising:
   incrementing the erase pulse loop count in response to having determined that at least the portion of the block of memory cells has failed the erase verification procedure, wherein repeating the step of applying the erase condition comprises:

applying the same erase condition to the block of memory cells if the erase pulse loop count is not larger than an expected number; and adjusting the erase condition and then applying the adjusted erase condition to the block of memory cells if the erase pulse loop count is larger than an expected number.

6. The erase method of claim 5, wherein adjusting the erase condition comprises:

adjusting the erase condition according to a first step level before-when the leakage current above the threshold is not present; and adjusting the erase condition according to a second step level smaller than the first step level when the leakage current above the threshold is present.

7. The erase method of claim 1 further comprising:

determining that the leakage current above the threshold is not present in response to a threshold voltage distribution of the block of memory cells being higher than the post program verify voltage, determining that the leakage current above the threshold is present in response to a portion of the threshold voltage distribution of the block of memory cells being not higher than the post program verify voltage, and changing the erase condition to be applied only to the portion of the block of memory cells rather than the entire block of memory cells in response to determining that the leakage current above the threshold is present.

8. The erase method of claim 1, further comprising:

performing a post program procedure to increase a threshold voltage distribution of the block of memory cells when the leakage current above the threshold is present.

9. The erase method of claim 1, wherein the erase verification procedure is performed for the portion of a block of memory cells rather than the entire block of memory cells.

10. The erase method of claim 1, further comprising:

adjusting the erase condition according to a first step level when the leakage current above the threshold is not present; and adjusting the erase condition according to a second step level smaller than the first step level when the leakage current above the threshold is present.

11. A memory device comprising:

a block of memory cells, and a controller coupled to the block of memory cells and is configured to:

initiate an erase operation on a block of memory cells by applying an erase condition;

perform an erase verification procedure on at least a portion of the block of memory cells using an erase verify voltage;

perform a detection procedure on at least a portion of the block of memory cells using a post program verify voltage between a final erase verify voltage and a final post program verify voltage to detect whether leakage current above a threshold is present in the block of memory cells passed the erase verification procedure;

iteratively adjust the erase verify voltage and the post program verify voltage, and repeatedly apply the erase condition, perform the erase verification procedure using the adjusted erase verify voltage, and perform the detection procedure using the adjusted post program verify voltage, until the adjusted erase verify voltage has reached the final erase verify voltage and the adjusted post program verify voltage has reached the final post program verify voltage; and finish the erase operation when the adjusted erase verify voltage has reached the final erase verify voltage and the adjusted post program verify voltage has reached the final post program verify voltage.

12. The memory device of claim 11, wherein the controller is configured to perform the erase verification procedure by:

determining whether a threshold voltage distribution of at least the portion of the block of memory cells is lower than the erase verify voltage or the adjusted erase verify voltage;

having determined that at least the portion of the block of memory cells has passed the erase verification procedure in response to the threshold voltage distribution of at least the portion of the block of memory cells being lower than the erase verify voltage or the adjusted erase verify voltage; and having determined that at least the portion of the block of memory cells has failed the erase verification procedure in response to a portion of the threshold voltage distribution of at least the portion of the block of memory cells not being lower than the erase verify voltage or the adjusted erase verify voltage.

13. The memory device of claim 12, wherein the controller is further configured to determine whether the adjusted erase verify voltage has reached the final erase verify voltage and whether the adjusted post program verify voltage has reached the final post program verify voltage when the leakage current above the threshold is not present, wherein the controller is configured to iteratively adjust the erase verify voltage by:

adjusting the erase verify voltage when an erase pulse loop count is equal to 1, or in response to determining that the adjusted erase verify voltage has not reached the final erase verify voltage and the adjusted post program verify voltage has not reached the final post program verify voltage.

14. The memory device of claim 12, wherein the controller is further configured to repeat the step of applying the erase condition by:

applying the erase condition to the block of memory cells again in response to having determined that at least the portion of the block of memory cells has failed the erase verification procedure.

15. The memory device of claim 13, wherein the controller is further configured to:

increment the erase pulse loop count in response to having determined that at least the portion of the block of memory cells has failed the erase verification procedure, wherein the controller is configured to repeat the step of applying the erase condition by:

applying the same erase condition to the block of memory cells if the erase pulse loop count is not larger than an expected number-again, and adjusting the erase condition and then applying the adjusted erase condition to the block of memory cells if the erase pulse loop count is larger than an expected number.

16. The memory device of claim 15, wherein the controller is configured to adjust the erase condition by:

adjusting the erase condition according to a first step level when the leakage current above the threshold is not present; and adjusting the erase condition according to a second step level smaller than the first step level when the leakage current above the threshold is present.

17. The memory device of claim 11, wherein the controller is further configured to:

determine that the leakage current above the threshold is not present in response to a threshold voltage distribution of the block of memory cells being higher than the post program verify voltage, determine that the leakage current above the threshold is present in response to a portion of the threshold voltage distribution of the block of memory cells being not higher than the post program verify voltage, and change the erase condition to be applied only to the portion of the block of memory cells rather than the entire block of memory cells in response to determining that the leakage current above the threshold is present.

18. The memory device of claim 11, wherein the controller is further configured to:

perform a post program procedure to increase a threshold voltage distribution of the block of memory cells when the leakage current above the threshold is present.

19. The memory device of claim 11, wherein the erase verification procedure is performed for the portion of a block of memory cells rather than the entire block of memory cells.

20. The memory device of claim 11, wherein the controller is further configured to:

adjust the erase condition according to a first step level when the leakage current above the threshold is not present; and adjust the erase condition according to a second step level smaller than the first step level when the leakage current above the threshold is present.

\* \* \* \* \*